(12) United States Patent
Shi

(10) Patent No.: US 12,019,237 B2
(45) Date of Patent: Jun. 25, 2024

(54) DISPLAY DEVICE, VEHICLE-MOUNTED DISPLAY SYSTEM, VEHICLE AND MANUFACTURING METHOD OF HOLOGRAPHIC LENS

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 577 days.

(21) Appl. No.: 16/472,428

(22) PCT Filed: Oct. 16, 2018

(86) PCT No.: PCT/CN2018/110490
§ 371 (c)(1),
(2) Date: Jun. 21, 2019

(87) PCT Pub. No.: WO2019/179085
PCT Pub. Date: Sep. 26, 2019

(65) Prior Publication Data
US 2021/0405362 A1      Dec. 30, 2021

(30) Foreign Application Priority Data

Mar. 21, 2018   (CN) .......................... 201810236339.X

(51) Int. Cl.
*G02B 27/01*      (2006.01)
*B60K 35/00*      (2024.01)
(Continued)

(52) U.S. Cl.
CPC .......... *G02B 27/0101* (2013.01); *B60K 35/00* (2013.01); *B60K 35/23* (2024.01);
(Continued)

(58) Field of Classification Search
CPC .... G02B 27/0101; G02B 3/005; G02B 27/30; G02B 2027/0107; B60K 2370/1529
See application file for complete search history.

(56) References Cited

U.S. PATENT DOCUMENTS 6,215,579 B1   4/2001   Bloom et al.
8,502,761 B2   8/2013   Bovet et al.
(Continued)

FOREIGN PATENT DOCUMENTS

CN   1372188 A   10/2002
CN   1487329 A   4/2004
(Continued)

OTHER PUBLICATIONS

Chinese Office Action in Chinese Application No. 201810236339.X, dateed Mar. 2, 2020 with English translation.
(Continued)

*Primary Examiner* — Alicia M Harrington
(74) *Attorney, Agent, or Firm* — Collard & Roe, P.C.; William Collard

(57) ABSTRACT

A display device and a vehicle including the display device, a vehicle-mounted display system and a method of manufacturing a holographic lens are provided. The display device includes a display array generation device and a first lens layer. The display array generation device is configured to provide a plurality of collimated light beams parallel to each other and spaced from each other; the first lens layer is arranged at a light exiting side of the display array generation device. The first lens layer includes a plurality of first microlenses arranged in array, and is configured to receive a plurality of collimated light beams. The plurality of collimated light beams correspond to the plurality of first
(Continued)

microlenses, to achieve a plurality of scanning imaging, respectively. The display device can be applied to head-up display systems.

14 Claims, 10 Drawing Sheets

(51) Int. Cl.
  *B60K 35/23* (2024.01)
  *G02B 3/00* (2006.01)
  *G02B 27/30* (2006.01)
(52) U.S. Cl.
  CPC ............. *G02B 3/005* (2013.01); *G02B 27/30* (2013.01); *G02B 2027/0107* (2013.01)

(56) References Cited

U.S. PATENT DOCUMENTS

| | | | |
|---|---|---|---|
| 9,798,153 B2 * | 10/2017 | Ide | ..................... G02B 26/0833 |
| 2015/0247723 A1 | 9/2015 | Abovitz et al. | |
| 2017/0010473 A1 | 1/2017 | Ide | |
| 2017/0293148 A1 * | 10/2017 | Park | .................. G02B 27/0172 |
| 2018/0188542 A1 * | 7/2018 | Waldern | ............. G02B 27/0172 |
| 2018/0203237 A1 * | 7/2018 | Shih | ..................... G02B 6/0028 |

FOREIGN PATENT DOCUMENTS

| | | | | |
|---|---|---|---|---|
| CN | 102520603 A | 6/2012 | | |
| CN | 103176276 A | 6/2013 | | |
| CN | 105425404 A | 3/2016 | | |
| CN | 105911700 A | 8/2016 | | |
| CN | 106164743 A | * 11/2016 | ............. | A61B 3/113 |
| CN | 106164748 A | 11/2016 | | |
| CN | 205787362 U | 12/2016 | | |
| CN | 107247333 A | 10/2017 | | |
| CN | 107329273 A | 11/2017 | | |
| CN | 107390380 A | 11/2017 | | |
| EP | 2 746 825 A1 | 6/2014 | | |
| EP | 3 349 051 B1 | 5/2020 | | |
| FR | 2 926 373 A1 | 7/2009 | | |
| JP | 2002-519714 A | 7/2002 | | |
| JP | 3542364 B2 * | 7/2004 | ............... | G02B 5/32 |
| WO | WO-2013028687 A2 * | 2/2013 | ......... | G02B 27/0081 |
| WO | 2017/041212 A1 | 3/2017 | | |

OTHER PUBLICATIONS

International Search Report of PCT/CN2018/110490 in Chinese, dated Jan. 15, 2019, with English translation.
Notice of Transmittal of the International Search Report of PCT/CN2018/110490 in Chinese, dated Jan. 15, 2019.
Written Opinion of the International Searching Authority of PCT/CN2018/110490 in Chinese, dated Jan. 15, 2019 with English translation.
Partial European Search Report in European Application No. 18889966.0 dated Nov. 5, 2021.

* cited by examiner

DISPLAY DEVICE, VEHICLE-MOUNTED DISPLAY SYSTEM, VEHICLE AND MANUFACTURING METHOD OF HOLOGRAPHIC LENS

CROSS REFERENCE TO RELATED APPLICATIONS

This application is the National Stage of PCT/CN2018/110490 filed on Oct. 16, 2018, which claims priority under 35 U.S.C. § 119 of Chinese Application No. 201810236339.X filed on Mar. 21, 2018, the disclosure of which is incorporated by reference.

TECHNICAL FIELD

Embodiments of the present disclosure relate to a display device, a vehicle-mounted display system, a vehicle and a manufacturing method of a holographic lens.

BACKGROUND

Head-up display system (HUD) which can project vehicle status information, such as vehicle speed, fuel level, and the like as well as indicative information, such as navigation, danger warning, and the like, on a windshield ahead of a driver for display, and In this way the driver can obtain the vehicle speed, fuel level and other relevant information in the case that his sight does not deviate from the road ahead.

Currently, vehicle-mounted head-up display systems are usually refractive-reflective optical systems (i.e., systems including refractive optical elements and reflective optical elements). However, with large distance of exit pupil (that is, the distance from an outermost optical face of a vehicle-mounted head-up display system at a light exiting side to an observing plane is large), big window (that is, the size of an observing zone on the observing plane is large) and large viewing angle, a refractive-reflective optical system has the problems of complex structure and huge volume, and this limits the wide application of HUD in vehicles. In addition, the vehicle-mounted head-up display system may be implemented with a waveguide structure. However, a stray light problem happens in the waveguide structure, and with the increasing of the HUD's aperture, the stray light problem will worsen further. Therefore, HUDs based on waveguide structure cannot be widely applied to vehicle-mounted head-up display systems at present.

SUMMARY

At least one embodiment of the present disclosure provides a display device, comprising a display array generation device and a first lens layer. The display array generation device is configured to provide a plurality of collimated light beams parallel to each other and spaced from each other; the first lens layer is arranged at a light exiting side of the display array generation device, includes a plurality of first microlenses arranged in array, and is configured to receive the plurality of collimated light beams. The plurality of collimated light beams correspond to the plurality of first microlenses, to achieve a plurality of scanning imaging, respectively.

At least one embodiment of the present disclosure also provides a vehicle-mounted display system comprising the display device provided by any embodiment of the present disclosure.

At least one embodiment of the present disclosure also provides a vehicle, comprising the display device provided by any embodiment of the present disclosure.

At least one embodiment of the present disclosure also provides a method of manufacturing a holographic lens, comprising providing a photosensitive substrate; providing a point light source and a parallel light on two sides of the photosensitive substrate, respectively; irradiating one surface of the photosensitive substrate by light outputted from the point light source, simultaneously, irradiating the other surface of the photosensitive substrate by the parallel light as a reference light, to allow the photosensitive substrate to record an interference pattern of the point light source and the reference light, and obtaining a hologram including amplitude information and phase information of the point light source.

BRIEF DESCRIPTION OF THE DRAWINGS

A brief description will be given below to the accompanying drawings of the embodiments to provide a more clear understanding of the technical proposals of the embodiments of the present disclosure. Apparently, the drawings described below only involve some embodiments of the present disclosure but are not intended to limit the present disclosure.

DETAILED DESCRIPTION

The technical solutions of the embodiments will be described in a clearly and completely way in connection with the drawings related to the embodiments of the disclosure. Apparently, the described embodiments are just a part but not all of the embodiments of the disclosure. Based on the described embodiments herein, one of ordinary skill in the art can obtain other embodiment(s), without any creative labor, which shall be within the scope of the present disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, 'on,' 'under,' 'a/one side,' 'another/other side,' or the like are only used to indicate relative position relationship, and when the absolute position of the object which is described is changed, the relative position relationship may be changed accordingly.

Figure 1A:
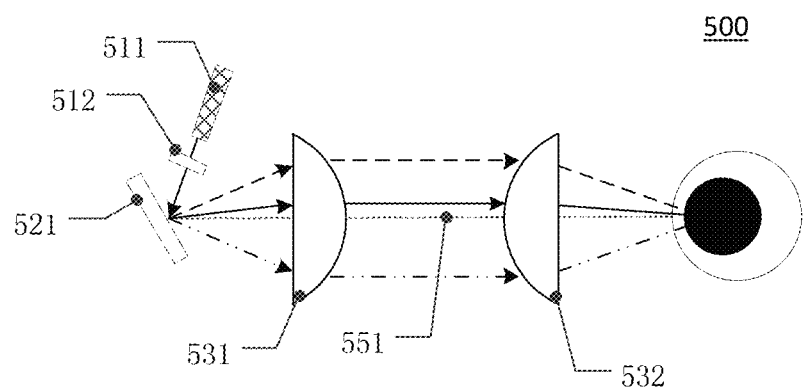
FIG. 1A is a schematic view illustrating a display device.

FIG. 1A is a schematic diagram illustrating a display device 500, which may be a retina scanning imaging device. For example, the display device 500 includes a light source 511, an external modulator 512, a mirror 521, a second lens 531, and a first lens 532, as shown in FIG. 1A. For example, the light source 511 can provide collimated light beams for display. The light source 511 may, for example, include a monochromatic light source (for example, red, green, and blue light sources), or a white light source. For example, the angle of a reflecting face of the mirror 521 relative to an optical axis 551 of the second lens 531 can vary continuously, in this way, the collimated light beams incident onto the mirror 521 can have different emergent angles (relative to the optical axis 551 of the second lens) at different times, and can thus be incident to different sites of the second lens 531 and the first lens 532. The collimated light beams incident to different sites of the first lens 532 at different times are focused by the first lens 532 to form different pixel points of an image.

For example, when the display device 500 shown in FIG. 1A is applied to a near eye display system, because the distance between a user's eyes and the first lens 532 is fixed (for example, the center of pupil of the user's eyes lies at an image-side focal point of the first lens 532), the user's pupils can receive lights emitted from the first lens 532 with different transmission angles (corresponding to different pixel points of an image); and at different times, the lights with different transmission angles directly form different pixel points of an image at different positions of the user's retina, respectively, and realizing the retina display.

Figure 1B:
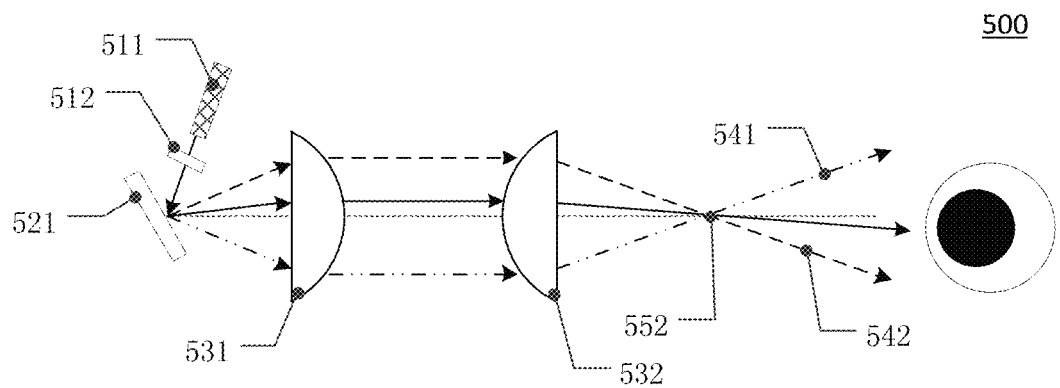
FIG. 1B is a schematic view illustrating application of the display device shown in FIG. 1A to a head-up display system.

As noticed by inventor(s) of this application, applying the display device 500 shown in FIG. 1A to a head-up display system might cause the user to see only part of the displayed image, resulting in the narrowing of the view field (for example, the scope between the maximum angles of lights emitted by the display device 500 and received by the user's pupils is too small). For example, as shown in FIG. 1B, when the user's pupils are located at one side of the image-side focal length of the first lens 532 away from the first lens 532, the user's pupils may not receive lights (e.g., a light 541 and a light 542) with larger transmission angles relative to the optical axis, and these lights with larger transmission angles cannot be imaged on the user's retina. In this case, the user can only see part of the displayed image.

At least one embodiment of the present disclosure provides a display device, including a display array generation device and a first lens layer. The display array generation device is configured to provide a plurality of collimated light beams parallel to each other and spaced from each other. The first lens layer is arranged at a light exiting side of the display array generation device, and the first lens layer includes a plurality of first lenses arranged in array and is configured to receive the plurality of collimated light beams. The plurality of collimated light beams correspond to the plurality of first lenses, so as to realize a plurality of scanning imaging, respectively.

Hereinafter, a non-restrictive description of the display device provided by an embodiment of this disclosure will be made by several examples. As described below, different features in these examples can be combined with each other without conflicting with each other, so as to obtain new examples. These new examples also fall within the scope of this disclosure.

Figure 2A:
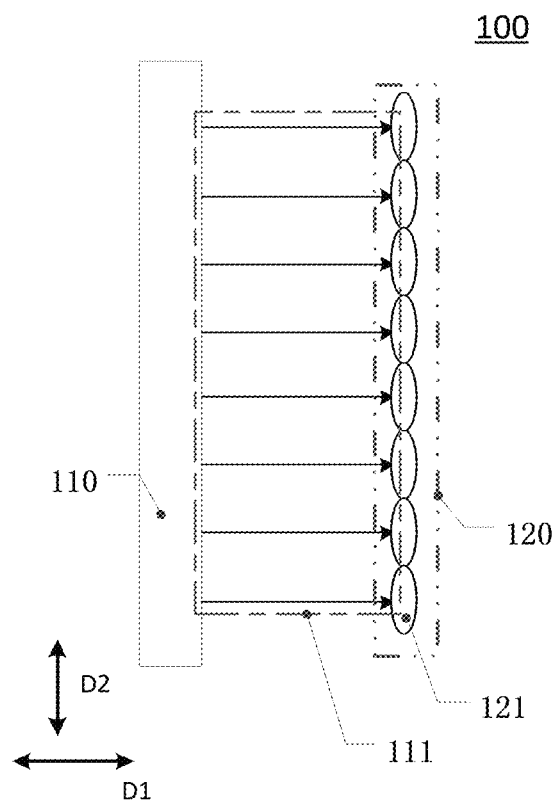
FIG. 2A is schematic side view illustrating a display device provided by an embodiment of the present disclosure.
Figure 5:
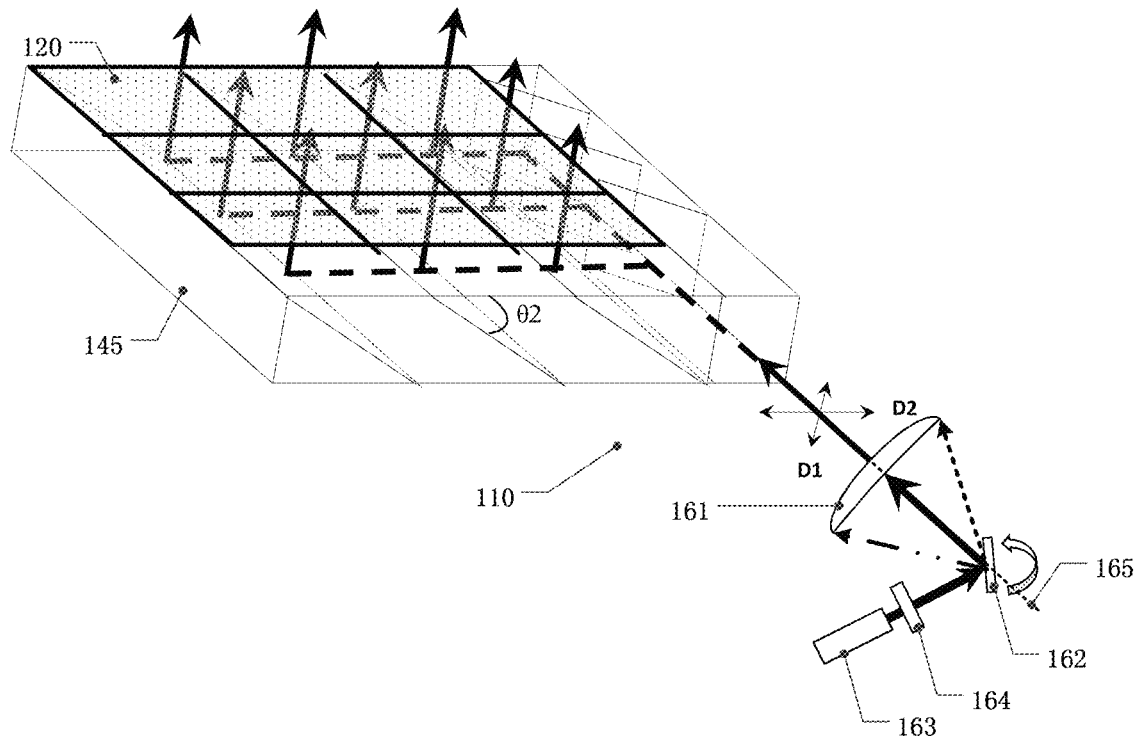
FIG. 5 is a schematically structural diagram illustrating a display device with a beam splitting element provided by an embodiment of the present disclosure.

For example, FIG. 2A shows a display device 100. For example, as shown in FIG. 2A, the display device 100 includes a display array generation device 110 and a first lens layer 120. For example, as shown in FIG. 2A, the display array generation device 110 is configured to provide a plurality of collimated light beams parallel to each other and spaced from each other. For example, as shown in FIG. 2A, the display array generation device 110 and the first lens layer 120 may be disposed with a spacing therebetween, but embodiments of the present disclosure are not limited thereto. For another example, as shown in FIG. 5, the display array generation device 110 and the first lens layer 120 may be attached to (that is, in direct contact with) each other.

For example, as shown in FIG. 2A, the first lens layer 120 is arranged at a light exiting side of the display array generation device 110, and includes a plurality of first microlenses 121 arranged in array. For example, FIG. 2B is a schematic plan view illustrating a first lens layer 120, in which a plurality of first microlenses 121 are arranged in a plane parallel to a second direction D2 and a third direction D3.

For example, the plurality of first microlenses 121 are configured to receive the plurality of collimated light beams 111, respectively. For example, as shown in FIG. 2A, the plurality of collimated light beams 111 may be incident vertically onto the plurality of first microlenses 121, but embodiments of the present disclosure are not limited thereto. For another example, the plurality of collimated light beams 111 may also be incident onto the plurality of first microlens 121 obliquely (refer to FIG. 7). Namely, the angle between the plurality of collimated light beams 111 and the normal direction of the corresponding first microlenses 121 is not equal to zero (for example, the angle is an acute angle).

Figure 2B:
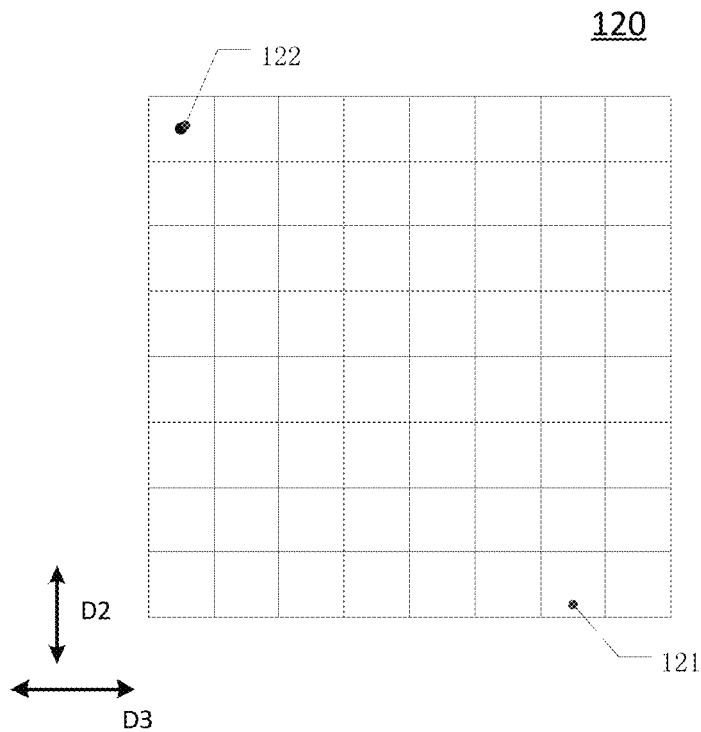
FIG. 2B is a schematic plan view illustrating a first lens layer provided by an embodiment of the present disclosure.

For example, as shown in FIG. 2B, each of the orthographic projections of the plurality of first microlenses 121 on an emergent surface may be rectangular, but embodiments of the present disclosure are not limited thereto. It is to be noted that the first microlens 121 provided by embodiments of this disclosure are not limited to the biconvex lenses shown in FIG. 2A, and for example, the first microlenses 121 may also be holographic microlenses, planoconvex lenses, aspheric lenses, free-form lenses or the like.

For example, in the case where the first microlenses 121 are biconvex lenses, as shown in FIG. 2A, the orthographic projection of each of the first microlenses 121 on an emergent surface may be circular, but embodiments of the present disclosure are not limited thereto. For another example, the orthographic projection of each first microlens 121 on the emergent surface may be rectangular (see FIG. 2B).

For example, the arrangement mode of the first microlenses 121 will be described in detail after the display array generation device 110 is described, and will not be restated here.

For example, the plurality of collimated light beams 111 correspond to the plurality of first microlenses 121, so as to achieve a plurality of scanning imaging, respectively. For example, as shown in FIG. 2A, the plurality of collimated light beams 111 may be in one-to-one correspondence to the plurality of first microlenses 121, and each of the collimated light beams, for example, is incident only to one of first microlenses 121.

For example, at any time, the plurality of collimated light beams 111 are incident to the same site on the corresponding first microlenses 121. For example, distances between the incident sites of the plurality of collimated light beams 111 and centers 122 of the corresponding first lenses are all equal to each other, and angles between connecting lines of the incident sites and centers 122 of the corresponding first lenses, and the third direction D3 are all equal to each other.

For example, sites on the plurality of first microlenses 121 where the plurality of collimated light beams 111 are incident may wholly translate over time. For example, at a time when a frame image is displayed, the number of sites on a corresponding first microlens 121 where each of the collimated light beams 111 is incident may be M1×N1, and correspondingly, at a time when the frame image is displayed, the angle of lights emitted from the first microlens 121 (the angle between an outgoing light and the normal direction of the first microlens 121) may be M1×N1. The light beams with M1×N1 angles may correspond to M1×N1 pixel points of the displayed image. For example, values of M1 and N1 may vary, and they may be 300 and 600, respectively, but embodiments of this disclosure are not limited thereto.

Figure 3A:
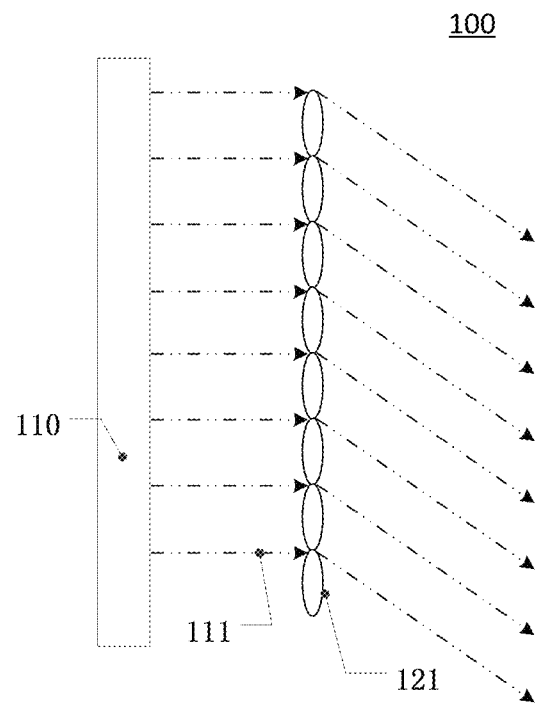
FIG. 3A is a diagram illustrating the light path of the display device shown in FIG. 2A at a first moment.
Figure 3B:
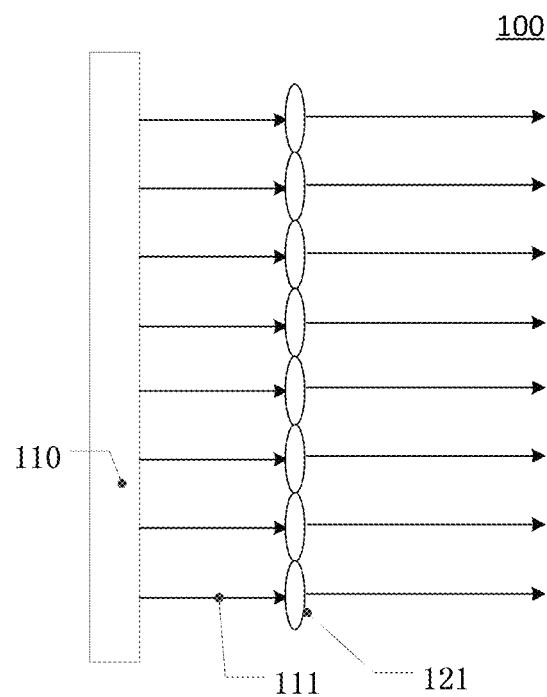
FIG. 3B is a diagram illustrating the light path of the display device shown in FIG. 2A at a second moment.
Figure 3C:
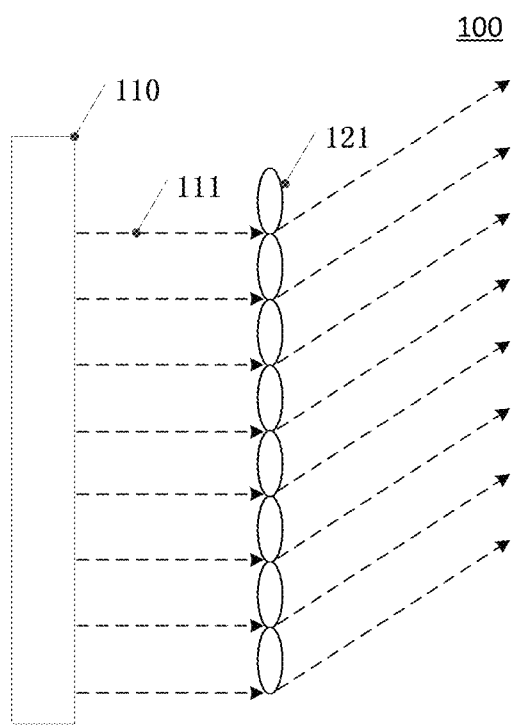
FIG. 3C is a diagram illustrating the light path of the display device shown in FIG. 2A at a third moment.

For example, an exemplary illustration will be given below in conjunction with FIG. 3A to FIG. 3C. For example, as shown in FIG. 3A, a plurality of collimated light beams 111 may be incident to upper edges of corresponding first microlenses 121 at the first moment; as shown in FIG. 3B, the plurality of collimated light beams 111 may be incident to centers of corresponding first microlenses 121 at the second moment; and as shown in FIG. 3C, the plurality of collimated light beams 111 may be incident to lower edges of corresponding first microlenses 121 at the third moment. For example, as shown in FIG. 3A to FIG. 3C, at any moment, the plurality of collimated light beams 111 may be emitted from the same site on the plurality of first microlenses 121, and angles between outgoing lights and optical axes of the first lenses may be all equal to each other. It is to be noted that site on the plurality of first microlenses 121 where the plurality of collimated light beams 111 are incident can translate in the second direction D2 over time and can translate in the third direction D3 over time.

For example, the translation mode of incident sites of the plurality of collimated light beams 111 includes, but is not limited to: the translation mode of site on the plurality of first microlenses 121 where the plurality of collimated light beams 111 are incident may be a row-by-row translation, or a column-by-column translation, or a random translation. For example, in the case where the translation mode of site on the plurality of first microlenses 121 where the plurality of collimated light beams 111 are incident is row-by-row translation, each of the collimated light beams may be firstly incident to N1 sites in the first row of a corresponding first microlens 121 in sequence, so that light beams corresponding to, such as N1 pixel points, in the first row of a displayed image can be formed sequentially by the corresponding first microlens 121; after that, the collimated light may be incident to N1 sites in the second row of a corresponding first microlens 121 in sequence, so that lights corresponding to, such as N1 pixel points, in the second row of the displayed image can be formed sequentially by the corresponding first microlens 121; and finally, the collimated light beam may be incident to N1 sites in the (M1)th row of a corresponding first microlens 121 in sequence, so that lights corresponding to, such as N1 pixel points, in the (M1)th row of the displayed image can be formed sequentially by the corresponding first microlens 121.

Figure 3D:
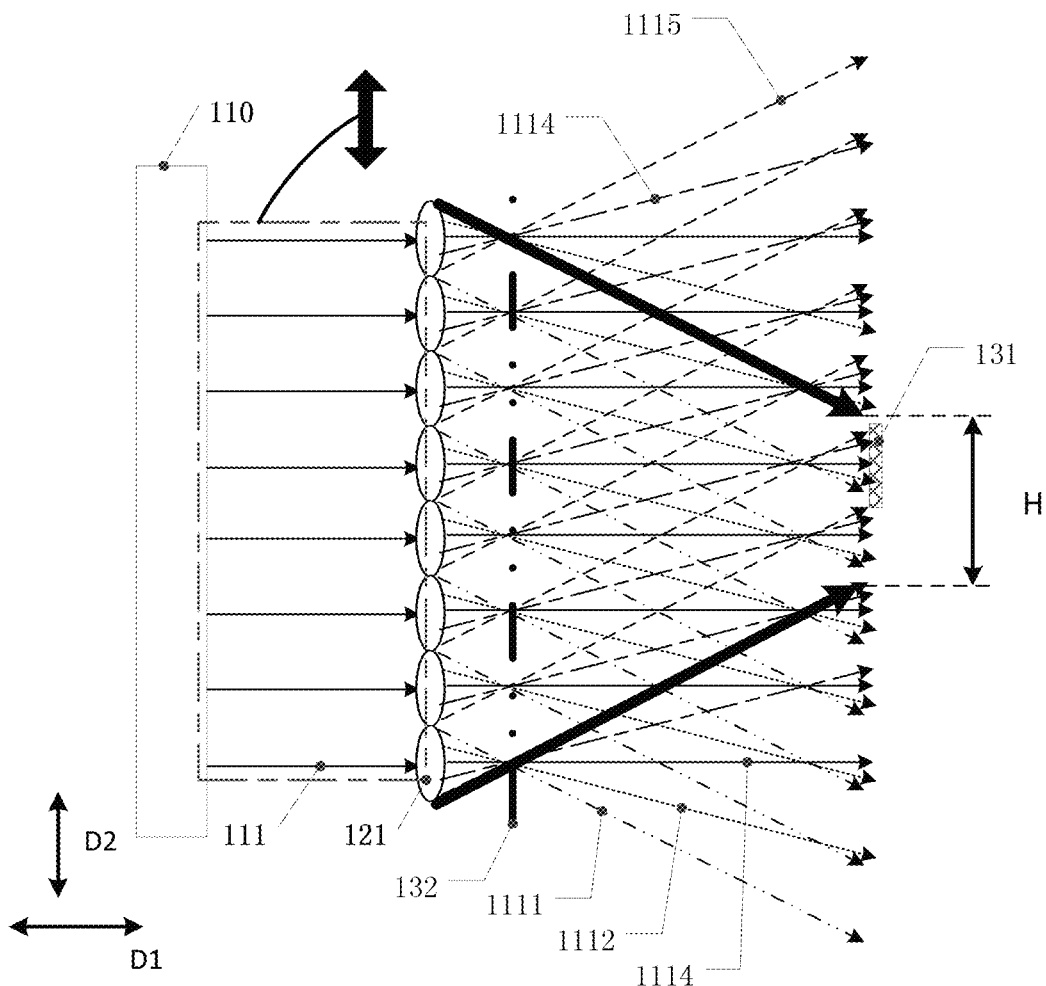
FIG. 3D is a diagram illustrating the light path of the display device shown in FIG. 2A in a time period of displaying a frame image.

For example, as shown in FIG. 3D, when the user's pupils are located at a side of a focal plane 132 of the first microlenses 121 away from the first microlenses 121, even if the user's pupils are unable to receive light beams that are transmitted by the same first microlens 121 at different emergent angles, the user's pupils can receive light beams that are transmitted by different first microlenses 121 at different emergent angles. As a result, different pixel points can be formed (for example, directly formed) at different positions on the user's retina by the light beams at different emergent angles. Owing to the effect of retentivity of vision of human eyes, the above-mentioned different pixel points formed at different positions on the user's retina at different times can form a complete image. An exemplary description will be made below in conjunction with FIG. 3D.

For example, as shown in FIG. 3D, eight first microlenses 121 arranged from top to bottom are referred to a first lens to an eighth lens, respectively. For example, at a watching location 131, although the user's pupils are unable to receive a first light beam 1111, a second light beam 1112, a third light beam 1113, a fourth light beam 1114 and a fifth light beam 1115 transmitted through any of the first microlenses 121 during a time period in which a frame image is displayed, the user's pupils may receive the first light beam 1111 transmitted through the second lens, the second light beam 1112 transmitted through the third lens, the third light beam 1113 transmitted through a fourth lens, the fourth light beam 1114 transmitted through a fifth lens, and the fifth light beam 1115 transmitted through a sixth lens during a period of time in which a frame image is displayed. For example, the above five light beams may form different pixel points on the user's retina at different times, so the user can observe a complete image. Consequently, the user can see a complete image even if the user's pupils are located at one side of the focal plane of the first microlenses 121 away from the first microlenses 121.

It is to be noted that, for clarity, only the first light beam 1111, the second light beam 1112, the third light beam 1113, the fourth light beam 1114 and the fifth light beam 1115 outputted by the first microlenses 121 are shown in FIG. 3D. The first microlenses 121 may also output multiple collimated beams (e.g., a sixth light beam, a seventh light beam, an eighth light beam, etc.) possessing more emergent angles, so as to form more pixel points on the user's retina. As a result, the resolution of a displayed image can be further improved.

For example, exit pupil diameter H of the display device 100 shown in FIG. 3D may be determined by the emergent angle of outermost light beams of first microlenses 121 arranged at the edge of the first lens layer 120 (for example, a first light beam 1111 of the first microlens 121 and a fifth light beam 1115 of the eighth lens) and the distance between the user's pupils and the first microlenses 121. For example, in case that the user's pupil is located in the exit pupil of the display device 100 shown in FIG. 3D, the user can see a complete image.

For example, by arranging the display array generation device 110 and providing a plurality of collimated light beams 111 parallel to each other and spaced from each other for achieving multiple scanning imaging, it is possible to increase the distance range of a watching zone of the display device 100 (for example, the range of distance between the user's pupils and first microlenses 121 and/or the value of exit pupil diameter), and in turn, the display device 100 provided by embodiments of the present disclosure can be applied to head-up display systems.

For example, structure of the display array generation device 110 may be set as required. For example, an exemplary description will be made below on a structure of the display array generation device 110 in conjunction with FIG. 4A to FIG. 4D and FIG. 5.

For example, the display array generation device 110 may include a beam splitting element 140. The beam splitting element 140 may be configured to divide an incident single beam into a plurality of collimated light beams 111. For example, an exemplary description will be made below on a structure of the beam splitting element 140 in conjunction with FIG. 4A to FIG. 4D.

Figure 4A:
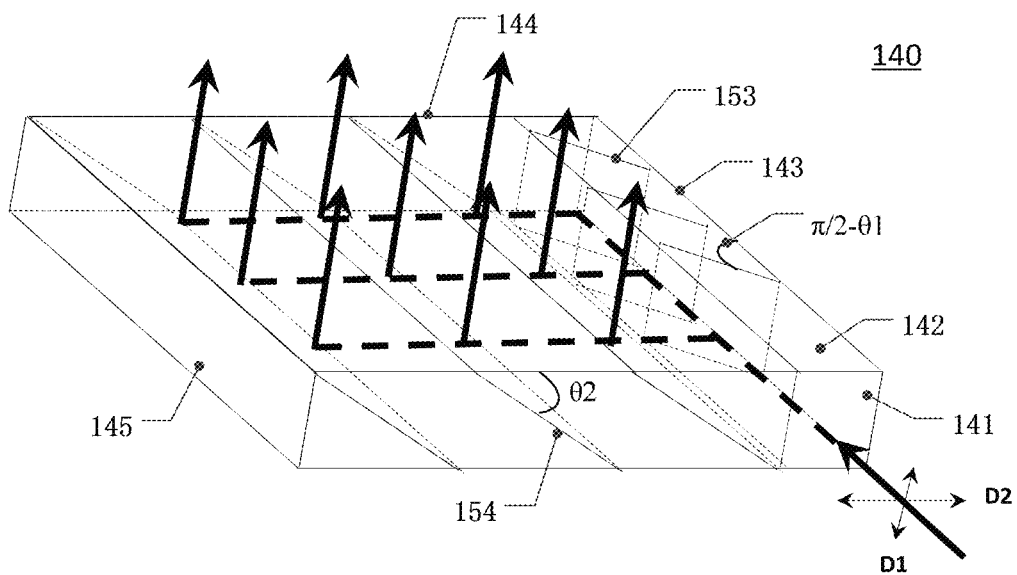
FIG. 4A is a schematically structural diagram illustrating a beam splitting element provided by an embodiment of the present disclosure.

For example, as shown in FIG. 4A, the beam splitting element 140 may include an incident side 141 and an emergent surface 142 that are perpendicular to each other. For example, the beam splitting element 140 may further include a first side 143 perpendicular to the incident side 141 and the emergent surface 142, a second side 144 opposed to the incident face, and a third side 145 opposed to the first side 143. However, embodiments of the present disclosure are not limited thereto.

For example, the first direction D1 may be perpendicular to the emergent surface 142, the second direction D2 may be perpendicular to the first side 143 and the third side 145, the third direction D3 may be perpendicular to the incident side 141 and the second side 144, but embodiments of the present disclosure are not limited thereto. For example, the first direction D1 may be perpendicular to the second direction D2 and the third direction D3, and the second direction D2 may be perpendicular to the third direction D3, but embodiments of the present disclosure are not limited thereto.

Figure 4B:
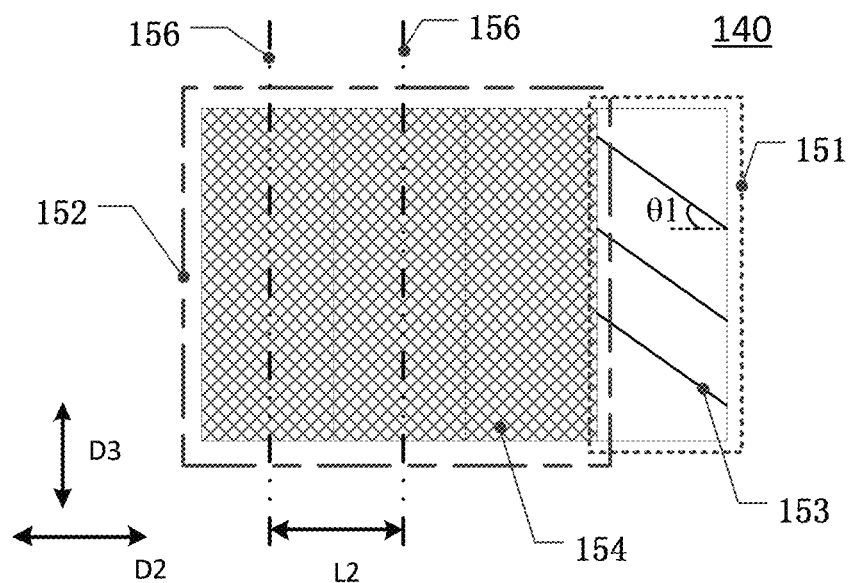
FIG. 4B is the orthographic projection of a first transflective plane group and a second transflective plane group of the beam splitting element shown in FIG. 4A on an emergent surface.

For example, as shown in FIG. 4A and FIG. 4B, the beam splitting element 140 may include a first transflective plane group 151 and a second transflective plane group 152. For example, as shown in FIG. 4B, the first transflective plane group 151 may include a plurality of first transflective planes 153 parallel to each other, and the second transflective plane group 152 may include a plurality of second transflective planes 154 parallel to each other.

For example, as shown in FIG. 4B, the first transflective plane group 151 and the second transflective plane group 152 may be disposed oppositely. For example, the first transflective plane group 151 and the second transflective plane group 152 "being disposed oppositely" refers to that, surfaces of the first transflective plane group 151 for reflecting collimated light beams are disposed to face surfaces of the second transflective plane group 152 for reflecting the collimated light beams, and the first transflective plane group 151 is not required to be parallel to the second transflective plane group 152.

For example, as shown in FIGS. 4A and 4B, the angle θ1 between each of the first transflective planes 153 and the incident side 141 may be an acute angle (for example, the angle θ1 between a surface for reflecting light s of each of the first transflective planes 153 and the incident side 141 may be an acute angle), and the angle θ2 between each of the second transflective planes 154 and the emergent surface 142 may be an acute angle (for example, the angle θ2 between a surface for reflecting lights of each of the second transflective planes 154 and the emergent surface 142 may be an acute angle). In this way, the opposite disposition of the first transflective plane group 151 and the second transflective plane group 152 can be realized. However, embodiments of the present disclosure are not limited thereto.

For example, the angle θ1 between each of the first transflective planes 153 and the incident side 141 may be about 45 degrees; In this way, it is possible to simplify the design and fabrication process of the beam splitting element 140 while allowing emergent sites of the plurality of collimated light beams 111 to be evenly distributed on the emergent surface 142. However, embodiments of the present disclosure are not limited thereto.

For example, the angle θ2 between each of the second transflective planes 154 and the emergent surface 142 may be in a range of 25 degrees to 35 degrees, but embodiments of this disclosure are not limited thereto. For another example, the angle θ2 between a second transflective plane 154 and the emergent surface 142 may also be about 45 degrees.

For example, the number of first transflective planes 153 included in the first transflective plane group 151 and the number of second transflective planes 154 included in the second transflective plane group 152 may be set, and embodiments of this disclosure are not limited to the cases shown in the drawings. For example, the beam splitting element 140 shown in FIG. 4A will be exemplarily described below with reference to an example in which the first transflective plane group 151 includes three first transflective planes 153, the second transflective plane group 152 includes three second transflective planes 154.

For example, as shown in FIG. 4A, in the case that a single collimated beam is incident onto the first one of the first transflective planes 153, the single collimated beam is divided into two collimated beams, namely, a first reflected light beam and a first transmitted light beam. The above-mentioned first transmitted light beam will continue to travel forward in the original transmission direction, and will be incident onto the second one of the first transflective planes 153 and the third one of the first transflective planes 153, which form a second reflected light beam and a third reflected light beam, respectively.

For example, as shown in FIG. 4A, the above-mentioned first reflected light beam will be incident onto the three second transflective planes 154 arranged in the second direction D2, and form three first sub-reflected light beams arranged in the second direction D2, respectively, and the three first sub-reflected light beams are emitted from the emergent surface 142. The second reflected light beam will be incident onto the three second transflective planes 154 arranged in the second direction D2, and form three second sub-reflected light beams arranged in the second direction D2, respectively, and the three second sub-reflected light beams are emitted from the emergent surface 142. The third reflected light beam will be incident onto the three second transflective planes 154 arranged in the second direction D2, and form three third sub-reflected light beams arranged in the second direction D2, respectively, and the three third sub-reflected light beams are emitted from the emergent surface 142.

For example, the beam splitting element 140 shown in FIG. 4A may divide a single collimated beam into 3×3 collimated beams, but embodiments of the present disclosure are not limited thereto. For example, in the case that the number of first transflective planes 153 included in the first transflective plane group 151 and the number of second transflective planes 154 included in the second transflective plane group 152 are 1024 and 768, respectively, the beam splitting element 140 can divide a single collimated beam into 1024×768 collimated beams.

For example, each of the first transflective planes 153 may be perpendicular to the emergent surface 142, and each of the second transflective planes 154 may be perpendicular to the incident side face 141. In this way, the design and fabrication process of beam splitting element 140 can be simplified while allowing the emergent sites of the plurality of collimated light beams 111 to be uniformly distributed on the emergent surface 142.

Figure 4C:
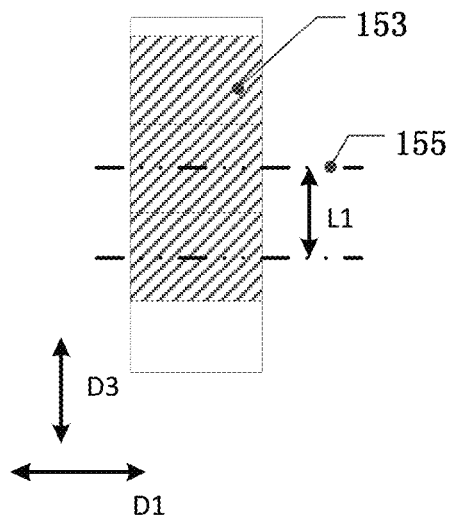
FIG. 4C is the orthographic projection of a first transflective plane group of the beam splitting element shown in FIG. 4A on a first side.
Figure 4D:
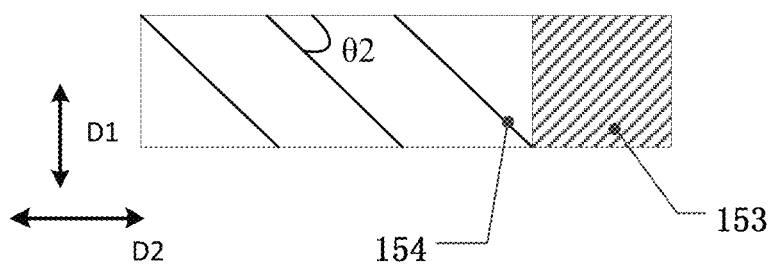
FIG. 4D is the orthographic projection of a first transflective plane group and a second transflective plane group of the beam splitting element shown in FIG. 4A on an incident side.

For example, FIG. 4B shows the orthographic projection of the first transflective plane group 151 and the second transflective plane group 152 on the emergent surface 142; FIG. 4C shows the orthographic projection of the first transflective plane group 151 on the first side 143; and FIG. 4D shows the orthographic projection of the first transflective plane group 151 and the second transflective plane group 152 on the incident side 141.

For example, as shown in FIG. 4C, a symmetric axis 155 of the orthographic projection of each of the first transflective planes 153 on the first side 143 in the third direction D3 may extend in the first direction D1. For example, as shown in FIG. 4B, a symmetric axis 156 of a second transflective plane 152 in the second direction D2 may extend in the third direction D3.

For example, a spacing L1 between symmetric axes 155 (symmetric axes in the third direction D3) of the orthographic projection of adjacent first transflective planes 153 on the first side 143 may be not zero and less than 8 mm, and a spacing L2 between symmetric axes 156 (symmetric axes in the second direction D2) of the orthographic projection of adjacent second transflective planes 154 on the emergent surface 142 may be not zero and less than 8 mm.

For example, a plurality of collimated light beams 111 outputted by the beam splitting element 140 may be in one-to-one correspondence to a plurality of first microlenses 121 of the first lens layer 120. For example, a symmetric axis of the orthographic projection of each of the first microlenses 121 on the emergent surface 142 in the second direction D2 may be coincident with a symmetric axis 156 of the orthographic projection of a corresponding second transflective plane 154 on the emergent surface 142, and a symmetric axis of the orthographic projection of each of the first microlenses 121 on the first side 143 in the third direction D3 may be coincident with a symmetric axis 155 of the orthographic projection of a corresponding first transflective plane 153 on the first side 143.

For example, the pupil diameter of human eyes is usually less than 8 mm. For example, by limiting the values of L1 and L2 to the pupil diameter of human eyes or less, such as, less than approximately 8 mm, the spacing between centers (or optical axes) of adjacent first microlenses 121 can be reduced, and the user's pupils are allowed to receive collimated light beams outputted from the first microlenses 121 in all directions at any exit pupil position, which enables the user to observe a complete image.

For example, as shown in FIG. 4C and FIG. 4B, borders of the orthographic projections of adjacent first transflective planes 153 on the first side 143 may adjoin each other, and borders of the orthographic projections of adjacent second transflective planes 154 on the emergent surface 142 may adjoin each other. With this arrangement, the size of first microlenses 121 can be increased while allowing the user to observe a complete image. In this way, it is possible to increase the number of transmission angles of collimated light beams outputted by each of the first microlenses 121 during the time period in which a frame image is displayed and/or to increase the angular spacing between collimated light beams whose angles are adjacent. In turn, the resolution and/or clarity of the displayed image can be increased.

For example, spacings between the orthographic projection of the first transflective plane group 151 on the first side 143 and the incident side 141 and the second side 144 shown in FIG. 4C are only examples; and for example, two borders of the orthographic projection of the first transflective plane group 151 on the first side 143 may also be joined to the incident side 141 and the second side 144, respectively. For example, spacing between the orthographic projection of the second transflective plane group 152 on the emergent surface 142 and the third side 145 shown in FIG. 4B is only an example; and for example, the orthographic projection of the second transflective plane group 152 on the emergent surface 142 may be spaced from the third side 145.

For example, the reflectivity of a plurality of first transflective planes 153 may increase sequentially, and the reflectivity of a first transflective plane 153 near the second side 144 may be greater than the reflectivity of a first transflective plane 153 near the incident face. For example, the reflectivity of a plurality of second transflective planes 154 may increase sequentially, and the reflectivity of a second transflective plane 154 near the third side 145 is greater than that of a second transflective plane 154 near the first side 143. In this case, the uniformity of optical intensity of the plurality of collimated light beams 111 outputted by the beam splitting element 140 can be enhanced, and quality of the displayed image can be promoted.

For example, the reflectivity of the $n^{th}$ first transflective plane 153 relative to the incident side 141 may be $1/(N+1-n)$, where N is the amount of first transflective planes 153 in the first transflective plane group, and the reflectivity of a plurality of second transflective planes 154 is, for example, not less than about 75%. In this way, the uniformity of optical intensity of the plurality of collimated light beams 111 outputted by the beam splitting element 140 and the quality of the displayed image can be further promoted.

For example, the first transflective planes 153 and the second transflective planes 154 may adopt a multilayered dielectric film, which may be formed by a film forming process, such as evaporation process, etc. on a transparent material, such as a transparent glass material or/and a transparent crystal material, using dielectric materials with different refractive indices. For example, the shape of the transparent glass material or/and the transparent crystal material may be designed according to actual application requirements.

For example, the shape of the transparent glass material or/and the transparent crystal material may be a prism of various shape and size (e.g., a triangular prism, a quadrangular prism, and orthographic projection of which may be a right angled triangle, parallelogram, and trapezoid, etc.). For example, at least one surface of the above prisms may be formed with a first transflective plane 153 and/or a second transflective plane 154, and after the above prisms are attached to each other, a cuboid can be formed. In this case, the incident side 141, the emergent surface 142, the first side 143, the second side 144, and the third side 145 can be physical planes.

For example, the shape of the transparent glass material or/and the transparent crystal material may be a plate (e.g., a rectangular plate), rectangular plates with first transflective planes 153 formed thereon may be parallel to each other, and rectangular plates with the second transflective planes 154 formed thereon may be parallel to each other. In this case, the incident side 141, the emergent surface 142, the first side 143, the second side 144 and the third side 145 can be virtual planes.

For example, the beam splitting element 140 may also be configured to wholly translate emergent sites of the plurality of collimated light beams 111 based on the incident site of a single beam. For example, as shown in FIG. 4A, in the case that the incident site of a single collimated beam moves in the second direction D2, the orthographic projection of site on a plurality of first transflective planes 153, at which the single collimated beam is incident, on the first side 143 moves in the third direction D3. As a result, emergent sites of the plurality of collimated light beams 111 can be wholly translated in the third direction D3. For example, as shown in FIG. 4A, in the case that the incident site of a single collimated beam moves in the first direction D1, the orthographic projections of sites on the second transflective plane 154, at which the first reflected light, the second reflected light, and the third reflected light are incident, on the emergent surface 142 move in the second direction D2. In this way, emergent sites of the plurality of collimated light beams 111 can be wholly translated in the second direction D2. Consequently, by making the incident site of a single beam move in the first direction D1 and the second direction D2, emergent sites of the plurality of collimated light beams 111 can be wholly translated in the third direction D3 and the second direction D2. Namely, the beam splitting element 140 can permit the emergent sites of the plurality of collimated light beams 111 to be wholly translated based on the incident site of a single beam.

For example, by arranging the beam splitting element 140 in the display array generation device 110, the incident single beam can be divided into a plurality of collimated light beams 111, and the emergent sites of the plurality of collimated light beams 111 can be wholly translated based on the incident site of the single beam. In this way, with the display array generation device 110, provision of a plurality of collimating light sources and a plurality of beam translation elements (for example, beam translation elements formed by an angle-adjustable mirror 162 and second microlenses 161) can be avoided, and provision of a synchronizing device for synchronization of the plurality of collimating light sources and the plurality of beam translation elements can also be avoided. In turn, the size, weight and cost of the display array generation device 110 can be reduced.

For example, as shown in FIG. 5, the display array generation device 110 may further include a second microlens 161 (e.g., one second microlens 161). For example, the second microlens 161 may be a collimating lens. For example, the second microlens 161 may be disposed oppositely to the incident side 141, and may be configured to receive collimated light beams with different incident angles at different times. For example, the above collimated light beams with different incident angles may pass through the same point (for example, each of them passes through an object-side focal point of the second microlens 161) at different times, and be incident to different positions of the second microlens 161. In this case, the second microlens 161 can allow collimated light beams with different incident angles to have the same emergent angles and different emergent sites, In this way, beams outputted by the second microlens 161 can be incident to different sites on the incident side 141 of the beam splitting element 140 at the same angle at different times. In turn, emergent sites of the plurality of collimated light beams 111 outputted by the beam splitting element 140 can be wholly translated in the second direction D2 and the third direction D3.

For example, the light pass aperture (or diameter) of the second microlens 161 may be equal to or greater than thickness of the beam splitting element in the first direction D1, which allows the moving distance of a single beam incident on the incident side in the first direction D1 to be equal to or greater than thickness of the beam splitting element in the first direction D1.

It is to be noted that the second microlens 161 provided by an embodiment of this disclosure is not limited to the planoconvex lens shown in FIG. 5, and for example, the first microlens 121 may be a biconvex lens, a holographic microlens, an aspheric lens, a free-form lens, etc., however, embodiments of this disclosure are not limited thereto.

For example, as shown in FIG. 5, the display array generation device 110 may further include an angle-adjustable mirror 162. For example, the angle-adjustable mirror 162 may include an angle-adjustable mirror fabricated on the basis of micro-electromechanical system (that is, a MEMS mirror). For example, the angle-adjustable mirror 162 may be configured such that a collimated beam incident thereon is incident to different positions of the second microlens 161 at different angles at different times.

For example, under the drive of a display signal, a reflecting face of the angle-adjustable mirror 162 may rotate to different predetermined positions at different times, In this way, a collimated light incident on the angle-adjustable mirror 162 is enabled to have different emergent angles (relative to an optical axis of the second microlens 161) at different times. And, a collimated light outputted by the mirror 162 with adjustable angle is allowed to be incident to different positions of the second microlens 161 at different incident angles at different times, so that a plurality of collimated light beams 111 outputted by the beam splitting element 140 are incident to different positions of the first microlens 121 at different times, and form different pixel points of an image on the user's retina. For example, the angle between the reflecting face of the angle adjustable mirror 162 and the optical axis of the second microlens 161 may have the capability of continuous adjustment. In this way, the reflecting face of the angle adjustable mirror 162 is capable of rotating to a predetermined position.

For example, as shown in FIG. 5, the display array generation device 110 may further include a collimating light source 163. For example, the collimating light source 163, act as a light source for display, may be configured to provide collimated beams, and the collimating light source 163 may, for example, include a monochromatic light source (such as a red, green, or blue monochromatic light), or a white light source, etc. For example, collimated beams provided by the collimating light source 163 may have exactly same transmission angle, but embodiments of this disclosure are not limited thereto. For example, collimated beams provided by the collimating light source 163 may also have a tiny divergence angle, the divergence angle of collimated beams may, for example, be any value less than 1 degree, but embodiments of this disclosure are not limited thereto. For example, the collimating light source 163 may include a laser (e.g., a laser diode), but embodiments of this disclosure are not limited thereto.

For example, in the case that the collimating light source 163 includes a laser diode, the intensity of light outputted by the laser diode may be changed by changing a driving current of the laser diode, so that different pixels of a displayed image are allowed to have different grayscales (e.g., predetermined grayscales), but embodiments of this disclosure are not limited thereto. For another example, the display array generation device 110 may further include an external modulator 164, which may be arranged at a light exiting side of the collimating light source 163, so as to adjust the optical intensity of collimated beams incident onto the second microlens 161. In this way, different pixels of a displayed image are allowed to have different grayscales.

The setting mode of a first lens layer 120 will be illustrated below in conjunction with FIG. 5 to FIG. 7 and FIG. 8A and FIG. 8B.

Figure 6:
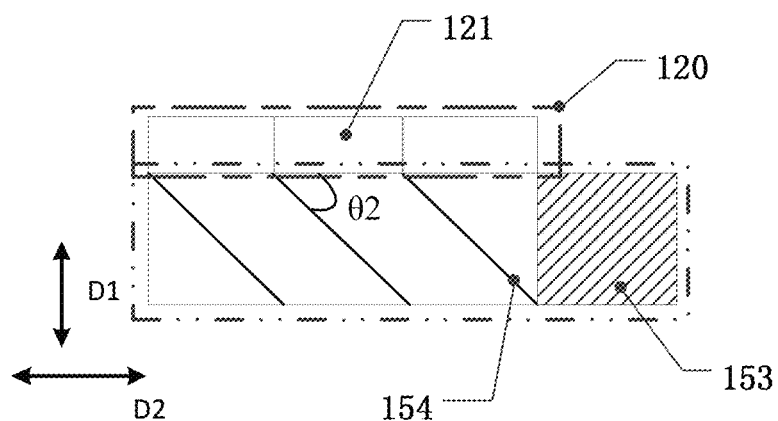
FIG. 6 is the orthographic projection of the beam splitting element and the first lens layer shown in FIG. 5 on an incident side.

For example, as shown in FIG. 5 and FIG. 6, the first lens layer 120 may be superimposed on an light exiting surface of a beam splitting element 140 and be in direct contact with the light exiting surface of the beam splitting element 140, but embodiments of the present disclosure are not limited thereto. For example, the shape of each of the first microlenses 121 may be a rectangular plate; and lengths of two adjacent sides of the rectangular plate are equal to Ln and Lm, respectively. Here, Ln is the size of orthographic projection of a first transflective plane 153 on a first side 143 in a third direction D3 (that is, the arranging direction of a plurality of first transflective planes 153), and Lm is the size of orthographic projection of a second transflective planes 154 on an emergent surface 142 in a second direction D2 (that is, the arranging direction of a plurality of second transflective planes 154).

Figure 8A:
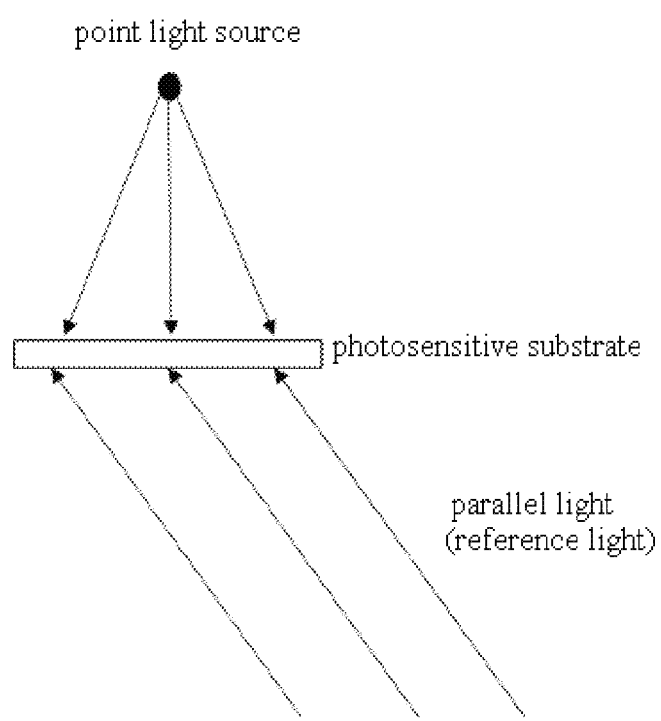
FIG. 8A is a schematic diagram illustrating the method of manufacturing a holographic lens.

For example, each of the first microlenses 121 may be a focusing lens. For example, each of the first microlenses 121 may be a holographic lens (e.g., holographic microlens). For example, the manufacturing method of the holographic lens may be designed. For example, an exemplary description will be made below on a method of manufacturing holographic lens in conjunction with FIG. 8A, but embodiment of this disclosure are not limited thereto. For example, as shown in FIG. 8A, lights (object lights) outputted from a point light source may be used to irradiate one side of a photosensitive substrate, and at the same time, parallel lights are used as reference lights to irradiate the other side of the photosensitive substrate. In this way, the photosensitive substrate can record an interference pattern of the point light source and the reference lights, and obtain a hologram including amplitude information and phase information of the point light source, that is, a holographic lens.

Figure 8B:
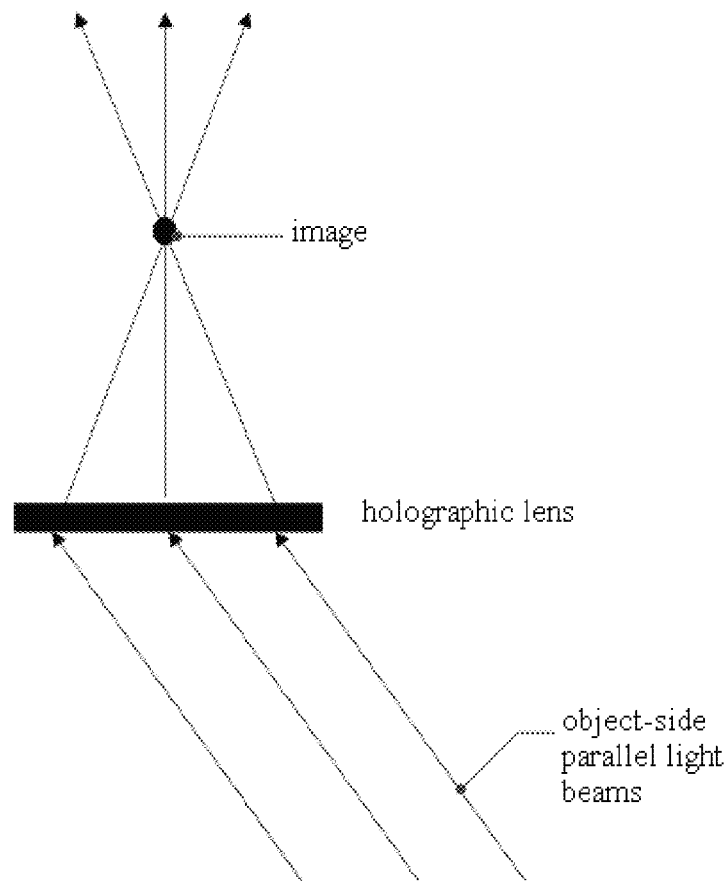
FIG. 8B is a schematic diagram illustrating reproduction of a point light source by a holographic lens.

For example, as shown in FIG. 8B, the holographic lens can reproduce an image of the point light source on the image side (at an image-side focal point) in the case that parallel beams (e.g., the same parallel beams as the reference lights) are used on the object side to irradiate the obtained holographic lens. In this way, the holographic lens shown in FIG. 8B has a focusing function.

For example, in the case where holographic lenses are used as the first microlenses 121, when a plurality of collimated light beams 111 irradiate separately onto the corresponding first microlenses 121, the plurality of first microlenses 121 will focus the plurality of collimated light beams 111, respectively, and make them separately pass through the corresponding focal points, so as to form respective ones of pixel points of a displayed image, respectively. For example, at another time, when incident sites of the plurality of collimated light beams 111 wholly translate on the first lens layer 120, the plurality of first microlenses 121 will focus the plurality of collimated light beams 111, respectively, and allow them to separately pass through the corresponding focal points, so as to form another ones of pixel points of the displayed image, respectively.

Figure 7:
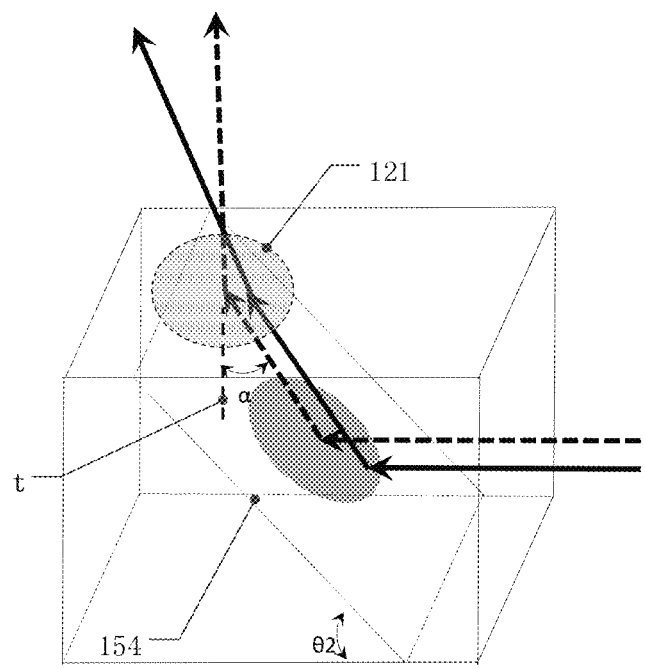
FIG. 7 is a diagram illustrating the local light path of a display array generation device provided by an embodiment of the present disclosure.

For example, as shown in FIG. 7, the working angle α of a holographic microlens and the angle θ (i.e. 02) between a second transflective plane 154 and the emergent surface 142 satisfy 2×θ+α=90°, but embodiments of the present disclosure are not limited thereto. For example, the working angle α of the holographic microlens (that is, the angle between the incident angle of a light and the normal direction t of the holographic microlens) may be in a range of about 20 degrees to about 40 degrees (e.g., about 25 degrees to about 35 degrees), and correspondingly, the angle θ between a second transflective plane 154 and the emergent surface 142 may be in a range of about 25 degrees to about 35 degrees, but embodiments of the present disclosure are not limited thereto.

For example, the holographic microlens has no focusing effect on lights whose incident angles are outside the working angle, so human eyes can see the holographic microlens array in a perspective manner. For example, as shown in FIG. 6, when the first microlens 121 is a holographic microlens, human eyes may see an object located on an upper surface of the first lens layer 120 away from a lower surface of the first lens layer 120, from the lower surface of the first lens layer 120, which enables the display device 100 provided by an embodiment of the present disclosure to be applied to head-up display systems and augmented reality display systems.

Figure 9:
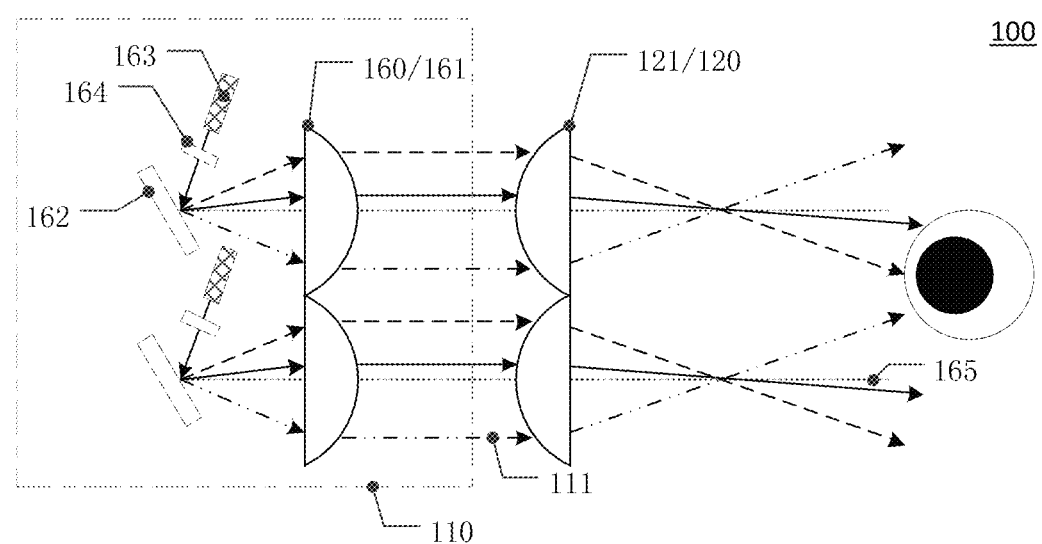
FIG. 9 is a schematic diagram illustrating another display array generation device provided by an embodiment of the present disclosure.

For example, an exemplary description will be made below on another structure of the display array generation device 110 in conjunction with FIG. 9. For example, as shown in FIG. 9, the display array generation device 110 comprises a mirror array including a plurality of mirrors 162, and a second lens layer 160. For example, as shown in FIG. 9, the mirror array may be disposed oppositely to the first lens layer 120, and include angle-adjustable mirrors 162 arranged in array. The second lens layer 160 may be arranged between the mirror array and the first lens layer 120 and include second microlenses 161 arranged in array. For example, for the sake of clarity, only two second microlenses 161 and two angle-adjustable mirrors 162 are shown in the display array generation device 110 shown in FIG. 9, but embodiments of the present disclosure are not limited thereto.

For example, as shown in FIG. 9, the display array generation device 110 may further include a plurality of collimating light sources 163 and a plurality of external modulators 164, and numbers of the collimating light sources 163 and the external modulators 164 may be equal to the number of second microlenses 161 in the second lens layer 160 and the number of first microlenses 121 in the first lens layer 120, respectively. For example, the arrangement mode of the collimating light sources 163 and the external modulators 164 may refer to the embodiment shown in FIG. 5, and is not repeated here.

For example, an angle-adjustable mirror 162 may include a mirror based on the micro-electromechanical system (i.e., a MEMS mirror). For example, an optical axis of each of the second microlenses 161 may pass through the center of a corresponding angle-adjustable mirror 162, and an intersection of the reflecting face of an angle adjustable mirror 162 and an optical axis of a corresponding second microlens 161 may be the focal point of the corresponding second microlens 161. However, embodiments of the present disclosure are not limited thereto. For example, an incident point on the reflecting face of an angle-adjustable mirror 162 where a collimated light provided by a collimating light source 163 is incident may also be the focal point of a corresponding second microlens 161, but embodiments of the present disclosure are not limited thereto.

For example, under the drive of a display signal, at any time, reflecting faces of a plurality of angle-adjustable mirrors 162 may have a same predetermined position, and multiple beams of light (e. g. collimating lights) incident on the reflecting faces of the plurality of angle adjustable mirrors 162 are allowed to be incident to a same site of corresponding second microlenses 161 at a same angle. In this way, it is possible to provide a plurality of collimated light beams 111, and to make them be incident to a same site of corresponding first microlenses 121 at a same angle. In turn, the plurality of first microlenses 121 can output multiple beams of light (e. g., collimated light beams) with a same transmission direction, and the multiple beams of light (e.g., collimated light beams) are allowed to pass through image-side focal points of corresponding first microlenses 121, respectively. The multiple beams of light (e. g., collimated light beams) with the same transmission direction outputted by the first microlenses 121 correspond to a same pixel point of a displayed image.

For example, under the drive of a display signal, the reflecting face of each of the angle-adjustable mirrors 162 may rotate to different predetermined positions at different times, so that multiple beams of light (e.g. collimated light beams) incident on corresponding angle adjustable mirrors 162 are allowed to have different emergent angles (relative to the optical axis of the second microlens 165) at different times, which allows multiple beams of light (e. g. collimated light beams) are enabled to be incident to different sites of corresponding second microlenses 161 at different times. In turn, the plurality of collimated light beams 111 outputted by the second lens layer 160 can be allowed to be incident to different sites of corresponding first microlenses 121 at different times, and then, a plurality of first microlenses 121 can permit the emergent direction of the outputted multiple beams of light (e.g., collimated light beams) with the same transmission direction to change. The multiple beams of light (e. g., collimated light beams), the emergent direction of which is changed, correspond to another pixel point of the displayed image. For example, by arranging the mirror array and the second lens layer 160, the display array generation device 110 is enabled to provide a plurality of collimated light beams 111 parallel to each other and spaced from each other, and the distance range of a watching zone of the display device 100 (for example, the range of distance between the user's pupils and the first microlenses 121, and/or the value of exit pupil diameter) can be increased. In turn, it can be applied to head-up display systems.

Figure 10:
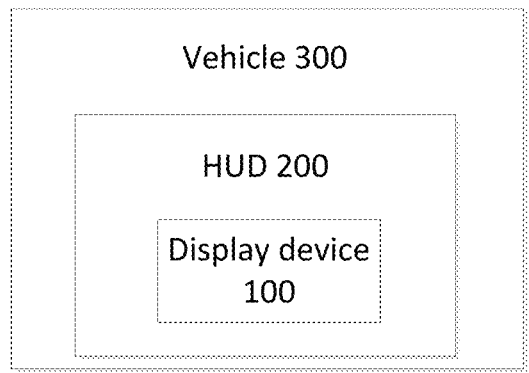
FIG. 10 is an exemplary block diagram illustrating a vehicle-mounted display system and a vehicle provided by an embodiment of the present disclosure.

At least one embodiment of the present disclosure also provides a vehicle-mounted display system and a vehicle. For example, FIG. 10 is an exemplary block diagram illustrating a vehicle-mounted display system 200 and a vehicle 300 provided by at least one embodiment of the present disclosure. For example, as shown in FIG. 10, the vehicle-mounted display system 200 includes any of display devices 100 provided by embodiments of the present disclosure, and the vehicle 300 may include any of display devices 100 or any of vehicle-mounted display systems 200 provided by embodiments of the present disclosure, for example, the vehicle-mounted display system is a vehicle-mounted head-up display system. The vehicle may be car, boat, train, etc., for example. The above vehicle-mounted head-up display system may be arranged in a driving cab or cockpit of the vehicle.

It is to be noted that, for other essential constituent parts (e.g., a signal encoding/decoding circuit, a power supply, etc.) of the display device 100, the vehicle-mounted head-up display system 200 and the vehicle 300, suitable conventional components may be adopted, and these shall be understandable by one of ordinary skill in the art, will not be repeated here, and shall not be construed as limitation of the present disclosure.

The following points should be noted:

(1) The accompanying drawings involve only the structure(s) in connection with the embodiment(s) of the present disclosure, and other structure(s) can be referred to common design(s).

(2) Without conflicting with each other, features in one embodiment or in different embodiments can be combined.

The above description is only the exemplary embodiments of the present disclosure for explaining the principle of the present disclosure, and the embodiments of the present disclosure are not limited thereto. A person of ordinary skill in the art can make various changes and modifications without departing from the principle of the embodiments of the present disclosure, and such changes and modifications shall fall into the scope of the present disclosure.

What is claimed is:

1. A display device, comprising: a display array generation device and a first lens layer, wherein the display array generation device is configured to provide a plurality of collimated light beams parallel to each other and spaced from each other;

the first lens layer is arranged at a light exiting side of the display array generation device, includes a plurality of first microlenses arranged in array, and is configured to receive the plurality of collimated light beams; and the plurality of collimated light beams correspond to the plurality of first microlenses, to achieve a plurality of scanning imaging, respectively;

the display array generation device includes a beam splitting element, the beam splitting element is configured to divide an incident single beam into the plurality of collimated light beams, and is configured to wholly translate emergent sites of the plurality of collimated light beams based on an incident site of the single beam;

the display array generation device is further configured such that, within the time of displaying a frame of image, the amount of the positions where each collimated light beam of the plurality of collimated light beams is incident on the corresponding first microlens and the amount of angles of light beams emitted by the corresponding first microlenses is equal to the amount of pixels of the image displayed by the display device;

the display array generation device further includes a second lens layer including a plurality of second microlenses arranged in array, the second microlenses are opposite to the incident side surface of the beam splitting element, and are configured to receive light beams with different incident angles at different times, and are configured so that the light beams with different incident angles are incident on the beam splitting element at the same angle on the incident side;

the display array generation device further includes an angle-adjustable reflector, the angle-adjustable reflector is configured such that the collimated light beams are incident on different positions of the second microlenses at different angles at different times;

the beam splitting element includes an incident side, an emergent surface, a first transflective plane group, and a second transflective plane group, the first transflective plane group includes a plurality of first transflective planes parallel to each other, and the second transflective plane group includes a plurality of second transflective planes parallel to each other;

an angle between each of the first transflective planes and the incident side is an acute angle, and an angle between each of the second transflective planes and the emergent surface is an acute angle, so that the first transflective plane group and the second transflective plane group are disposed oppositely; and the display array generation device further comprises a plurality of collimating light sources, each collimating light source provides the collimated light beams, and a plurality of external modulators, and numbers of the collimating light sources and the external modulators are equal to the number of the second microlenses and the number of the first microlenses in the first lens layer, respectively.

2. The display device according to claim 1, wherein
wherein each of the first transflective planes is perpendicular to the emergent surface; and
wherein each of the second transflective planes is perpendicular to the incident side.

3. The display device according to claim 2, wherein
the beam splitting element further includes a first side perpendicular to the incident side and the emergent surface,
a spacing between symmetric axes of orthographic projections of any adjacent first transflective planes on the first side being not zero and less than about 8 mm; and
a spacing between symmetric axes of orthographic projections of any adjacent second transflective planes on the emergent surface being not zero and less than about 8 mm.

4. The display device according to claim 3, wherein
borders of the orthographic projections of the adjacent first transflective planes on the first side adjoin each other; and
borders of the orthographic projections of the adjacent second transflective planes on the emergent surface adjoin each other.

5. The display device according to claim 2, wherein
the beam splitting element further includes a first side perpendicular to the incident side and the emergent surface, a second side opposed to the incident face and a third side opposed to the first side;
reflectivity of the plurality of first transflective planes increases sequentially, and the reflectivity of the first transflective plane near the second side is greater than that of the first transflective plane near the incident face; and
reflectivity of the plurality of second transflective planes increases sequentially, and the reflectivity of the second transflective plane near the third side is greater than that of the second transflective plane near the first side.

6. The display device according to claim 5, wherein
the reflectivity of the plurality of second transflective planes is not less than 75%; and
the reflectivity of the $n^{th}$ first transflective plane relative to the incident side is $1/(N+1-n)$, where N is the amount of the first transflective planes in the first transflective plane group.

7. The display device according to claim 2, wherein
the angle between each of the first transflective planes and the incident side is about 45 degrees; and
the angle between each of the second transflective planes and the emergent surface is in the range of about 25 degrees to about 35 degrees.

8. The display device according to claim 7, wherein each of the first microlenses is a holographic microlens.

9. The display device according to claim 8, wherein a working angle $\alpha$ of the holographic microlens and an angle $\theta$ between the second transflective planes and the emergent surface satisfy $2\times\theta+\alpha=90°$.

10. The display device according to claim 2, wherein each of the first microlenses is a holographic microlens.

11. The display device according to claim 10, wherein
a working angle $\alpha$ of the holographic microlens and an angle $\theta$ between the second transflective planes and the emergent surface satisfy $2\times\theta+\alpha=90°$.

12. The display device according to claim 1, wherein the collimating light source includes a laser; and
each mirror of the mirror array of the angle adjustable reflector is based on a micro-electromechanical system.

13. A vehicle, comprising a display device, wherein the display device comprises: a display array generation device and a first lens layer,
wherein the display array generation device is configured to provide a plurality of collimated light beams parallel to each other and spaced from each other;
the first lens layer is arranged at a light exiting side of the display array generation device, includes a plurality of first microlenses arranged in array, and is configured to receive the plurality of collimated light beams; and
the plurality of collimated light beams correspond to the plurality of first microlenses, to achieve a plurality of scanning imaging, respectively;
the display array generation device includes a beam splitting element, the beam splitting element being configured to divide an incident single beam into the plurality of collimated light beams, and being configured to wholly translate emergent sites of the plurality of collimated light beams based on an incident site of the single beam;
the display array generation device is further configured such that, within the time of displaying a frame of image, the amount of the positions where each collimated light beam of the plurality of collimated light beams is incident on the corresponding first microlens and the amount of angles of light beams emitted by the corresponding first microlenses is equal to the amount of pixels of the image displayed by the display device;
the display array generation device further includes a second lens layer including a plurality of second microlenses arranged in array, the plurality of second microlenses are opposite to the incident side surface of the beam splitting element, and are configured to receive light beams with different incident angles at different times, and are configured so that the light beams with different incident angles are incident on the beam splitting element at the same angle on the incident side;

the display array generation device further includes an angle-adjustable reflector, the angle-adjustable reflector is configured such that the collimated light beams are incident on different positions of the second microlenses at different angles at different times;

the beam splitting element includes a first transflective plane group and a second transflective plane group, the first transflective plane group includes a plurality of first transflective planes parallel to each other, and the second transflective plane group includes a plurality of second transflective planes parallel to each other; and an angle between each of the first transflective planes and the incident side is an acute angle, and an angle between each of the second transflective planes and an emergent surface is an acute angle, so that the first transflective plane group and the second transflective plane group are disposed oppositely; and the display array generation device further comprises a plurality of collimating light sources, each collimating light source provides the collimated light beams, and a plurality of external modulators, and numbers of the collimating light sources and the external modulators are equal to the number of the second microlenses and the number of the first microlenses in the first lens layer, respectively.

14. A vehicle-mounted display system, comprising a display device, wherein the display device comprises:

a display array generation device and a first lens layer, wherein the display array generation device is configured to provide a plurality of collimated light beams parallel to each other and spaced from each other;

the first lens layer is arranged at a light exiting side of the display array generation device, includes a plurality of first microlenses arranged in array, and is configured to receive the plurality of collimated light beams; and the plurality of collimated light beams correspond to the plurality of first microlenses, to achieve a plurality of scanning imaging, respectively;

the display array generation device includes a beam splitting element, the beam splitting element being configured to divide an incident single beam into the plurality of collimated light beams, and being configured to wholly translate emergent sites of the plurality of collimated light beams based on an incident site of the single beam;

the display array generation device is further configured such that, within the time of displaying a frame of image, the amount of the positions where each collimated light beam of the plurality of collimated light beams is incident on the corresponding first microlens and the amount of angles of light beams emitted by the corresponding first microlenses is equal to the amount of pixels of the image displayed by the display device;

the display array generation device further includes a second lens layer including a plurality of second microlenses arranged in array, the plurality of second microlenses are opposite to an incident side surface of the beam splitting element, and are configured to receive light beams with different incident angles at different times, and are configured so that the light beams with different incident angles are incident on the beam splitting element at the same angle on the incident side;

the display array generation device further includes an angle-adjustable reflector, the angle-adjustable reflector is configured such that the collimated light beams are incident on different positions of the second microlenses at different angles at different times;

the beam splitting element includes a first transflective plane group and a second transflective plane group, the first transflective plane group includes a plurality of first transflective planes parallel to each other, and the second transflective plane group includes a plurality of second transflective planes parallel to each other; and an angle between each of the first transflective planes and the incident side is an acute angle, and an angle between each of the second transflective planes and an emergent surface is an acute angle, so that the first transflective plane group and the second transflective plane group are disposed oppositely; and the display array generation device further comprises a plurality of collimating light sources, each collimating light source provide the collimated light beams, and a plurality of external modulators, and numbers of the collimating light sources and the external modulators are equal to the number of the second microlenses and the number of the first microlenses in the first lens layer, respectively.

* * * * *